(12) United States Patent
Yang et al.

(10) Patent No.: US 8,873,143 B2
(45) Date of Patent: Oct. 28, 2014

(54) THREE-DIMENSIONAL IMAGE DISPLAY APPARATUS

(75) Inventors: Zan Yang, Shenzhen (CN); Chia-chiang Hsiao, Shenzhen (CN); Chih-wen Chen, Shenzhen (CN)

(73) Assignee: Shenzhen China Star Optoelectronics Technology Co., Ltd, Guangdong (CN)

( * ) Notice: Subject to any disclaimer, the term of this patent is extended or adjusted under 35 U.S.C. 154(b) by 367 days.

(21) Appl. No.: 13/503,651

(22) PCT Filed: Mar. 30, 2012

(86) PCT No.: PCT/CN2012/073325
§ 371 (c)(1),
(2), (4) Date: Apr. 23, 2012

(87) PCT Pub. No.: WO2013/143124
PCT Pub. Date: Oct. 3, 2013

(65) Prior Publication Data
US 2013/0258465 A1    Oct. 3, 2013

(51) Int. Cl.
*G02B 27/26* (2006.01)
*G02B 27/22* (2006.01)

(52) U.S. Cl.
USPC .................................. 359/465; 359/477

(58) Field of Classification Search
None
See application file for complete search history.

(56) References Cited

U.S. PATENT DOCUMENTS

2013/0141681 A1*  6/2013  Takahashi et al. ............ 349/117
2013/0155505 A1*  6/2013  Kim et al. ..................... 359/465

* cited by examiner

*Primary Examiner* — Jade R Chwasz

(57) ABSTRACT

A three-dimensional image display apparatus is described. The three-dimensional image display apparatus includes a display panel and a film-type patterned retarder. The three-dimensional image display apparatus allows the phase retarding regions of the film-type patterned retarder to be deviated from the pixel regions of the display panel so that the line of vision the viewer along the extension of the phase retarding direction corresponds to the pixel regions of the display panel. In other words, the phase retarding regions of the film-type patterned retarder deviate from the pixel of the display panel to avoid the image crosstalk when the viewer looks on the three-dimensional image display apparatus.

9 Claims, 3 Drawing Sheets

THREE-DIMENSIONAL IMAGE DISPLAY APPARATUS

FIELD OF THE INVENTION

The present invention relates to an image display apparatus, and more particularly to a three-dimensional image display apparatus having a film-type patterned retarder (FPR) deviated from the pixels of the display apparatus.

BACKGROUND OF THE INVENTION

The three-dimensional image display applies stereoscopic or autostereoscopic technique to display three-dimensional images. The stereoscopic technique implements the three-dimensional effect by the image parallax of the viewer's right and left eyes. The stereoscopic technique includes the methods with the polarized glasses and without the polarized glasses which are widely applied. In the manner of taking polarized glasses, the image parallax of the viewer's right and left eyes can be displayed on the display apparatus based on direct sense of sight by changing the polarization direction of the image parallax of the viewer's right and left eyes. For example, a film-type patterned retarder (FPR) is applied to liquid crystal display (LCD) so that the viewer is capable of viewing the three-dimensional image using the polarized glasses. In the manner without polarized glasses, an optical plate with the separated image parallax of the viewer's right and left eyes in an optical axis is installed before or after the display apparatus for generating three-dimensional image.

Conventionally, the view faces squarely the three-dimensional image on the LCD to reduce the image crosstalk while viewing the image. That is, the image viewed by the viewer's right and left eyes causes the superimposed image with crosstalk. In the prior art, it is necessary to align the pitch of FPR to the viewer's line of light which squarely faces the pixels of the display apparatus to increase the visual frontal effect for the viewer. That is, the FPR pitch cannot be deviated from the pixels. However, while the LCD is installed in a tilted manner with respect to the viewer, i.e. the LCD display in non-frontal status corresponding to the viewer, the image crosstalk occurs when the viewer's line of sight faces squarely the pixels of the LCD panel.

Consequently, there is a need to develop an image display apparatus to solve the aforementioned problem of the image crosstalk while viewing the LCD display disposed in a tilt manner.

SUMMARY OF THE INVENTION

One objective of the present invention is to provide a three-dimensional image display apparatus to allow the phase retarding regions of the film-type patterned retarder to be deviated from the pixel regions of the display panel so as to avoid the image crosstalk when the viewer looks on the three-dimensional image display apparatus.

According to the above objective, the present invention sets forth a three-dimensional image display apparatus. The three-dimensional image display apparatus is adapted to a polarized glasses for viewing a three-dimensional image of the three-dimensional image display apparatus by using the polarized glasses wherein the polarized glasses is disposed within a medium material having a first refraction index (n1). The three-dimensional image display apparatus includes a display panel and a film-type patterned retarder.

The display panel includes a composite layer and a color filter layer on a lateral plane of the composite layer wherein the composite layer disposed along a predetermined direction "DP" has a second refraction index (n2) and a thickness "T", and the color filter layer includes a plurality of black matrixes.

The film-type patterned retarder attached to another lateral plane of the composite layer opposite to the lateral plane and disposed between the display panel and the polarized glasses. The film-type patterned retarder includes a plurality of boundary regions and a normal direction "DN" is defined as a direction perpendicular to the lateral plane of the composite layer via the one of the boundary regions. An incident direction "DI" is defined as a direction from the polarized glasses to the one of boundary regions. The incident direction "DI" and the normal direction "DN" form a visual angle ($\theta 1$). A refraction direction "DR" is defined as a direction from the one of the boundary regions 116 to one of the black matrixes correspondingly, and the refraction direction "DR" and the normal direction form a refraction angle ($\theta 2$). A deviated distance (Lps) between each of the black matrixes and each of the boundary regions is calculated by the first refraction index (n1), the second refraction index (n2), the visual angle ($\theta 1$) and the refraction angle ($\theta 2$) along the predetermined direction "DP".

In one embodiment, the composite layer comprises a substrate and a polarized layer attached to the substrate and wherein the substrate is disposed between the color filter layer and the polarized layer, and the polarized layer is disposed between the substrate and the film-type patterned retarder.

In one embodiment, the deviated distance has a range from 30 μm to 400 μm.

In one embodiment, the refraction angle ($\theta 2$) is represented by the following formula: $\theta 2 = \arcsin[n1*(\sin\theta 1/n2)]$.

In one embodiment, the deviated distance is represented by the following formula: $Lps = T*\tan(\theta 2)$.

In one embodiment, the predetermined direction is perpendicular to the normal direction.

In one embodiment, the color filter layer further comprises a plurality of pixel regions along the predetermined direction and each of the pixels is disposed between the black matrixes.

In one embodiment, the film-type patterned retarder further comprises a plurality of phase retarding regions along the predetermined direction and each of the phase retarding regions is disposed between the boundary regions.

In one embodiment, each of the phase retarding regions corresponds to each of the pixels and the deviated distance (Lps) is formed between each of the phase retarding regions and each of the pixel regions along the predetermined direction.

The present invention is to provide a three-dimensional image display apparatus so as to avoid the image crosstalk when the viewer looks on the three-dimensional image display apparatus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
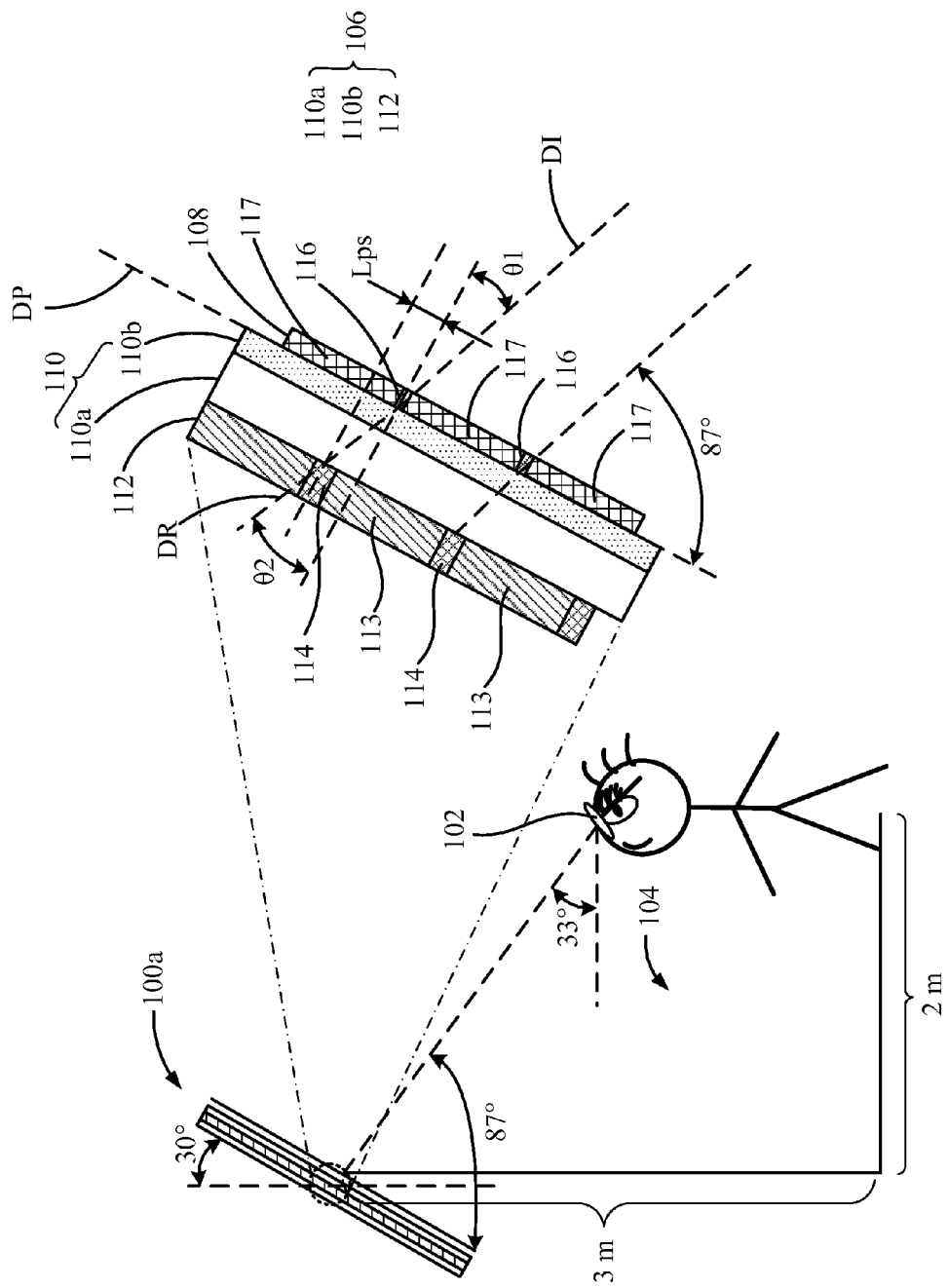
FIG. 1 is a schematic view of a three-dimensional image display apparatus according to a first embodiment of the present invention.

FIG. 1 is a schematic view of a three-dimensional image display apparatus 100a according to a first embodiment of the present invention. The three-dimensional image display apparatus 100a is adapted to a polarized glasses 102 for viewing a three-dimensional image of the three-dimensional image display apparatus 100a by using the polarized glasses 102 wherein the polarized glasses 102 is disposed within a medium material 104 having a first refraction index (n1). In one case, the medium material 104 is air having the first refraction index (n1) of one. In another case, the medium material 104 may be a variety of material with the different first refraction indexes. The three-dimensional image display apparatus 100a includes a display panel 106 and a film-type patterned retarder 108. As shown in FIG. 1, the three-dimensional image display apparatus 100a is liquid crystal display (LCD) which is disposed in a tilt manner.

The display panel 106 includes a composite layer 110 and a color filter layer 112 on a lateral plane of the composite layer 110 wherein the composite layer 110 disposed along a pre-determined direction "DP" has a second refraction index (n2) and a thickness "T", and the color filter layer 112 includes a plurality of black matrixes 114.

The film-type patterned retarder 108 attached to another lateral plane of the composite layer 110 opposite to the lateral plane and disposed between the display panel 106 and the polarized glasses 102. The film-type patterned retarder 108 includes a plurality of boundary regions 116 and a normal direction "DN" is defined as a direction perpendicular to the lateral plane of the composite layer 110 via the one of the boundary regions 116. An incident direction "DI" is defined as a direction from the polarized glasses 102 to the one of boundary regions 116. The incident direction "DI" and the normal direction "DN" form a visual angle ($\theta 1$). A refraction direction "DR" is defined as a direction from the one of the boundary regions 116 to one of the black matrixes 114 correspondingly, and the refraction direction "DR" and the normal direction form a refraction angle ($\theta 2$). A deviated distance (Lps) between each of the black matrixes 114 and each of the boundary regions 116 is calculated by the first refraction index (n1), the second refraction index (n2), the visual angle ($\theta 1$) and the refraction angle ($\theta 2$) along the predetermined direction "DP". In one embodiment, the predetermined direction "DP" is perpendicular to the normal direction "DN". The connection between incident direction "DI" and the refraction direction "DR" defines an extension of the phase retarding direction.

The color filter layer 112 further includes a plurality of pixel regions 113 along the predetermined direction "DP" and each of the pixels 113 is disposed between the black matrixes 114. The film-type patterned retarder 108 further includes a plurality of phase retarding regions 117 along the predetermined direction "DP" and each of the phase retarding regions 117 is disposed between the boundary regions 116. Each of the phase retarding regions 117 corresponds to each of the pixels 113 and the deviated distance (Lps) is formed between each of the phase retarding regions 117 and each of the pixel regions 113 along the predetermined direction "DP".

In one embodiment, as shown in FIG. 1, the composite layer 110 includes a substrate 110a and a polarized layer 110b attached to the substrate 110a wherein the substrate 110a is disposed between the color filter layer 112 and the polarized layer 110b, and the polarized layer 110b is disposed between the substrate 110a and the film-type patterned retarder 108.

In one embodiment, as shown in FIG. 1, if the LCD display is suspended at a distance of three meters from the ground and the LCD display tilts downward at thirty degrees with respect to the vertical wall, and a viewer of 1.7 meter tall stands before the LCD display to observe the three-dimensional image at a horizontal distance of two meters from the LCD display, the included angle between the incident angle "DI" and the horizontal direction is computed by following formula: arctan ((3−1.7)/2)=33° (degrees), and the visual angle ($\theta 1$) between the incident direction and the normal direction is computed by following formula: $\theta 1$=90−30−(90−33))=3° (degrees). If the first refraction index (n1) of air is one and the second refraction index (n2) of a glass substrate 110a is 1.5, the refraction angle ($\theta 2$) is computed by following formula: $\theta 2$=arcsin [n1*(sin $\theta 1$/n2)]=arcsin [1.0*(sin 3°/1.5)]=2° (degrees). If the thickness of the glass substrate 110a is 700 µm and the thickness of the polarized layer 110b is 315.1 µm, the thickness of the composite layer 110 including the glass substrate 110a and the polarized layer 110b equals to 1015.1 µm. The deviated distance (Lps) between each of boundary regions 116 and the corresponding black matrix 114 is computed by the following formula: −1015.1*(tan 2°)=−35.4 µm, where the negative sign represents the downward deviation. As a result, the computed deviated distance (Lps) can effectively avoid the image crosstalk when the viewer looks on the three-dimensional image display apparatus 100a which is disposed in a tilt manner.

According to the above-mentioned descriptions, the three-dimensional image display apparatus 100a allows the phase retarding regions 117 of the film-type patterned retarder 108 to be deviated from the pixel regions 113 of the display panel 113 so that the line of vision the viewer along the extension of the phase retarding direction corresponds to the pixel regions 113 of the display panel 106. In other words, the phase retarding regions 117 of the film-type patterned retarder 108 deviate from the pixel of the display panel 106 to avoid the image crosstalk when the viewer looks on the three-dimensional image display apparatus 100a which is disposed in a tilt manner to solve the problem of image crosstalk.

Figure 2:
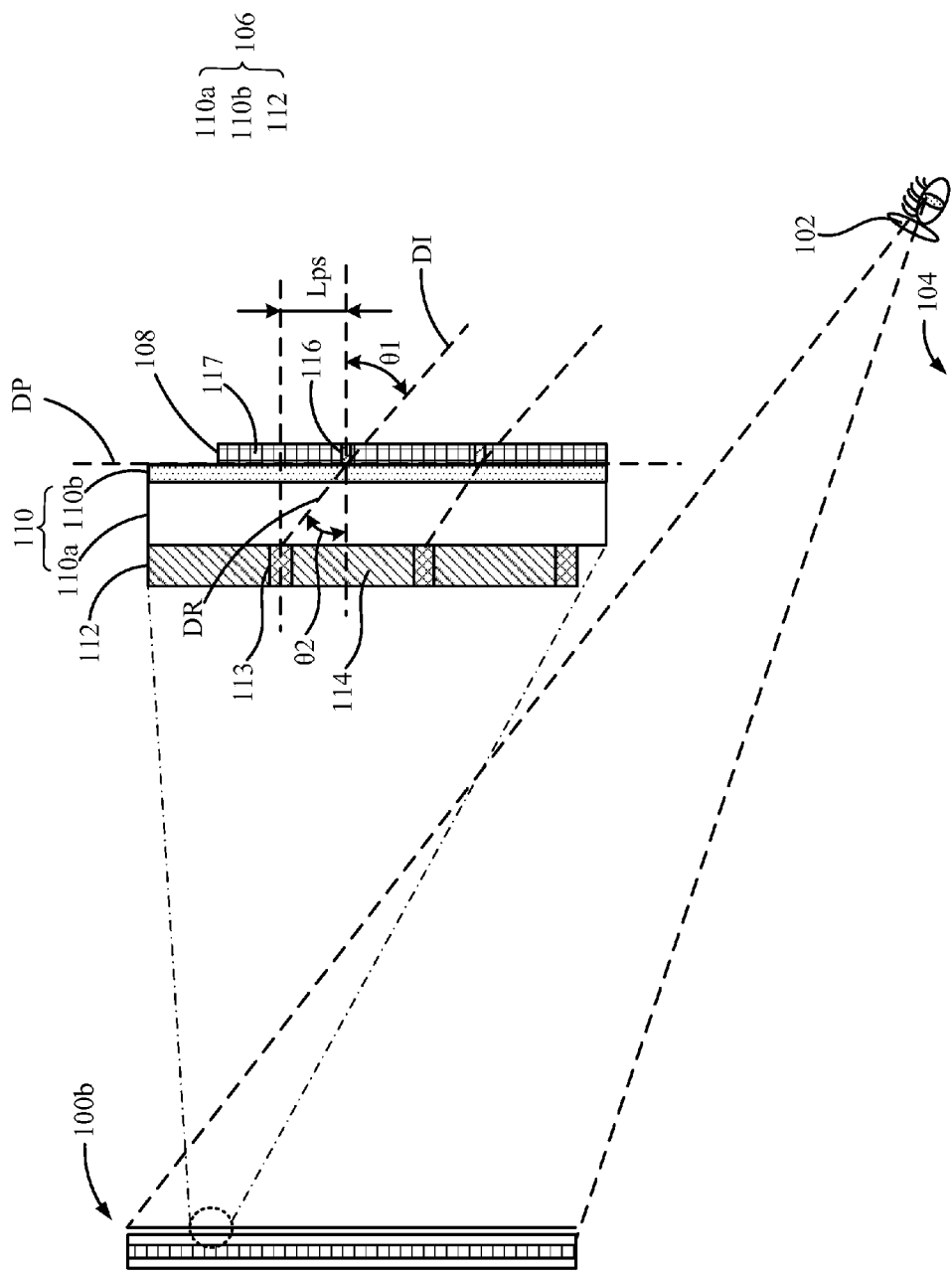
FIG. 2 is a schematic view of a three-dimensional image display apparatus according to a second embodiment of the present invention.

FIG. 2 is a schematic view of a three-dimensional image display apparatus 100b according to a second embodiment of the present invention. As shown in FIG. 2, if the three-dimensional image display apparatus 100b is a LCD display vertically suspended on the wall at zero degrees, and a viewer stands before the LCD display to observe the three-dimensional image at a horizontal distance of two meters from the LCD display, the included angle between the incident angle "DI" and the horizontal direction is computed by following formula: arctan ((3−1.7)/2)=33° (degrees), and the visual angle ($\theta 1$) between the incident direction "DI" and the normal direction "DN" of the composite layer 110 is computed by following formula: $\theta 1$=90−30−(90−33)=3° (degrees). If the first refraction index (n1) of air 104 is one and the second refraction index (n2) of a glass substrate 110a is 1.5, the refraction angle ($\theta 2$) is computed by following formula: $\theta 2$=arcsin [n1*(sin $\theta 1$/n2)]=arcsin [1.0*(sin 33°/1.5)] =22.29° (degrees). The deviated distance (Lps) between each of boundary regions 116 and the corresponding black matrix 114 is computed by the following formula: −1015.1*(tan 22.29°)=−395.6 µm, where the negative sign represents the downward deviation. As a result, the viewer can uses the polarized glasses 102 to see better image quality on the three-dimensional image display apparatus 100b. In one embodiment, the deviated distance has a range from 30 µm to 400 µm.

Figure 3:
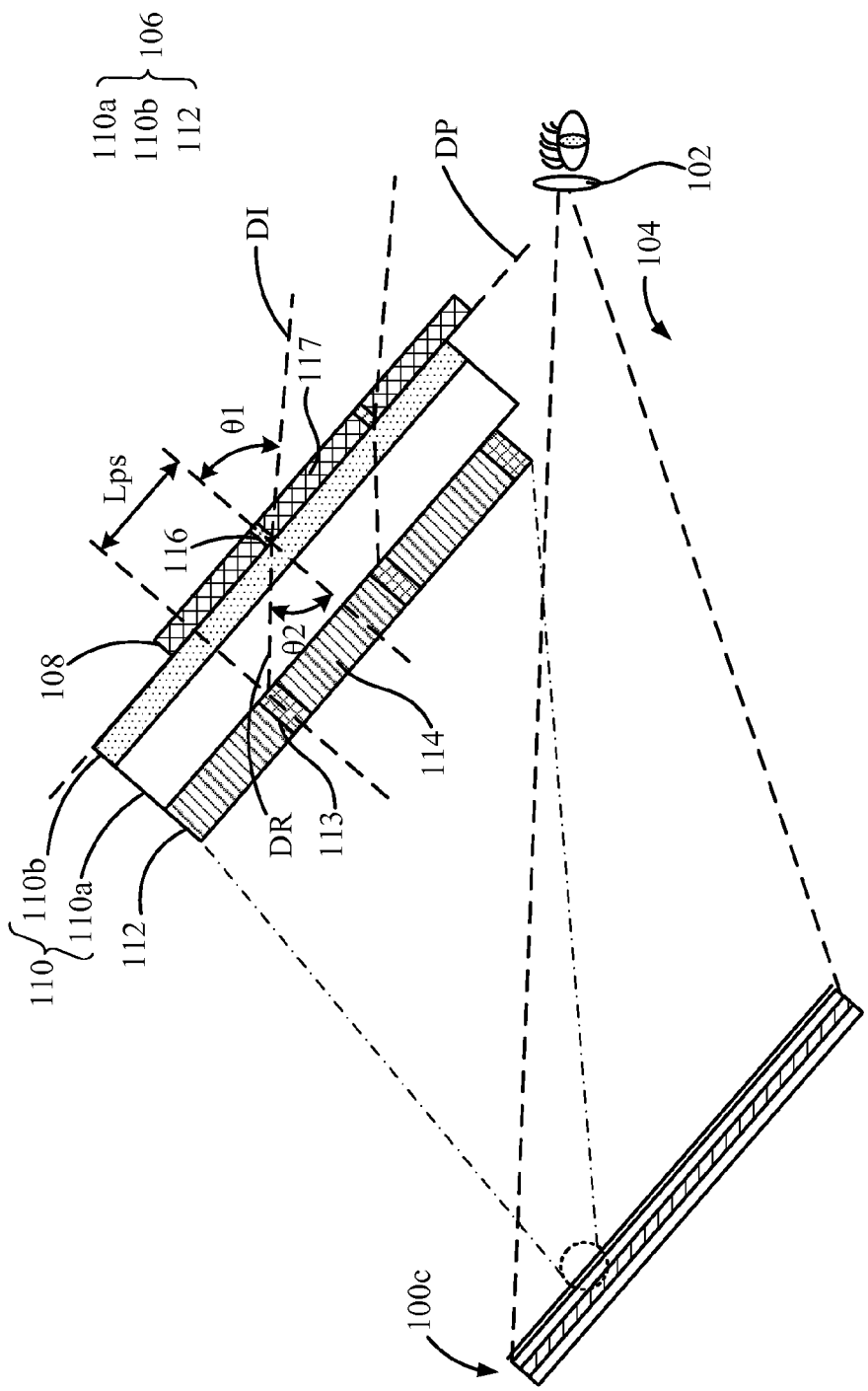
FIG. 3 is a schematic view of a three-dimensional image display apparatus according to a third embodiment of the present invention.

FIG. 3 is a schematic view of a three-dimensional image display apparatus 100c according to a third embodiment of the present invention. As shown in FIG. 3, in one embodiment, the three-dimensional image display apparatus 100c is disposed in a overlooked manner.

The three-dimensional image display apparatus 100c is adapted to a polarized glasses 102 for viewing a three-dimensional image of the three-dimensional image display apparatus 100c by using the polarized glasses 102 wherein the polarized glasses 102 is disposed within a medium material 104 having a first refraction index (n1). In one case, the medium material 104 is air having the first refraction index (n1) of one. In another case, the medium material 104 may be a variety of material with the different first refraction indexes. The three-dimensional image display apparatus 100c includes a display panel 106 and a film-type patterned retarder 108. The display panel 106 include a composite layer 110 and a color filter layer 112 on a lateral plane of the composite layer 110 wherein the composite layer 110 disposed along a predetermined direction "DP" has a second refraction index (n2) and a thickness "T", and the color filter layer 112 includes a plurality of black matrixes 114.

The film-type patterned retarder 108 attached to another lateral plane of the composite layer 110 opposite to the lateral plane and disposed between the display panel 106 and the polarized glasses 102. The film-type patterned retarder 108 includes a plurality of boundary regions 116 and a normal direction "DN" is defined as a direction perpendicular to the lateral plane of the composite layer 110 via the one of the boundary regions 116. An incident direction "DI" is defined as a direction from the polarized glasses 102 to the one of boundary regions 116. The incident direction "DI" and the normal direction "DN" form a visual angle (θ1). A refraction direction "DR" is defined as a direction from the one of the boundary regions 116 to one of the black matrixes 114 correspondingly, and the refraction direction "DR" and the normal direction form a refraction angle (θ2). A deviated distance (Lps) between each of the black matrixes 114 and each of the boundary regions 116 is calculated by the first refraction index (n1), the second refraction index (n2), the visual angle (θ1) and the refraction angle (θ2) along the predetermined direction "DP". In one embodiment, the predetermined direction "DP" is perpendicular to the normal direction "DN".

The color filter layer 112 further includes a plurality of pixel regions 113 along the predetermined direction "DP" and each of the pixels 113 is disposed between the black matrixes 114. The film-type patterned retarder 108 further includes a plurality of phase retarding regions 117 along the predetermined direction "DP" and each of the phase retarding regions 117 is disposed between the boundary regions 116. Each of the phase retarding regions 117 corresponds to each of the pixels 113 and the deviated distance (Lps) is formed between each of the phase retarding regions 117 and each of the pixel regions 113 along the predetermined direction "DP".

According to the aforementioned descriptions, the three-dimensional image display apparatus allows the phase retarding regions of the film-type patterned retarder to be deviated from the pixel regions of the display panel to avoid the image crosstalk when the viewer looks on the three-dimensional image display apparatus.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A three-dimensional image display apparatus adapted to a polarized glasses for viewing a three-dimensional image of the three-dimensional image display apparatus by using the polarized glasses wherein the polarized glasses is disposed within a medium material having a first refraction index (n1), the three-dimensional image display apparatus comprising:

a display panel having a composite layer and a color filter layer on a lateral plane of the composite layer, wherein the composite layer disposed along a predetermined direction has a second refraction index (n2) and a thickness (T), and the color filter layer comprises a plurality of black matrixes; and a film-type patterned retarder attached to another lateral plane of the composite layer opposite to the lateral plane and disposed between the display panel and the polarized glasses, wherein the film-type patterned retarder comprises a plurality of boundary regions and a normal direction is defined as a direction perpendicular to the lateral plane of the composite layer via the one of the boundary regions, wherein an incident direction is defined as a direction from the polarized glasses to the one of boundary regions, the incident direction and the normal direction form a visual angle (θ1), a refraction direction is defined as a direction from the one of the boundary regions to one of the black matrixes correspondingly, and the refraction direction and the normal direction form a refraction angle (θ2), and wherein a deviated distance (Lps) between each of the black matrixes and each of the boundary regions is calculated by the first refraction index (n1), the second refraction index (n2), the visual angle (θ1) and the refraction angle (θ2) along the predetermined direction.

2. The three-dimensional image display apparatus of claim 1, wherein the composite layer comprises a substrate and a polarized layer attached to the substrate and wherein the substrate is disposed between the color filter layer and the polarized layer, and the polarized layer is disposed between the substrate and the film-type patterned retarder.

3. The three-dimensional image display apparatus of claim 1, wherein the deviated distance has a range from 30 μm to 400 μm.

4. The three-dimensional image display apparatus of claim 1, wherein the refraction angle (θ2) is represented by the following formula:

$$\theta 2 = \arcsin[n1*(\sin\theta 1/n2)].$$

5. The three-dimensional image display apparatus of claim 4, wherein the deviated distance is represented by the following formula:

$$Lps = T*\tan(\theta 2).$$

6. The three-dimensional image display apparatus of claim 1, wherein the predetermined direction is perpendicular to the normal direction.

7. The three-dimensional image display apparatus of claim 1, wherein the color filter layer further comprises a plurality of pixel regions along the predetermined direction and each of the pixels is disposed between the black matrixes.

8. The three-dimensional image display apparatus of claim 7, wherein the film-type patterned retarder further comprises a plurality of phase retarding regions along the predetermined direction and each of the phase retarding regions is disposed between the boundary regions.

9. The three-dimensional image display apparatus of claim 8, wherein each of the phase retarding regions corresponds to each of the pixels and the deviated distance (Lps) is formed between each of the phase retarding regions and each of the pixel regions along the predetermined direction.

* * * * *